United States Patent [19]

Kunishige

[11] Patent Number: 5,268,729
[45] Date of Patent: Dec. 7, 1993

[54] MEANS FOR REPEATEDLY MEASURING OBJECT DISTANCE RESPONSIVE TO PULSE LIGHT REFLECTED FROM AN OBJECT AND UTILIZING THE MEASUREMENTS FOR PHOTOGRAPHING

[75] Inventor: Keiji Kunishige, Hachioji, Japan

[73] Assignee: Olympus Optical Co., Ltd., Tokyo, Japan

[21] Appl. No.: 847,959

[22] Filed: Mar. 5, 1992

[30] Foreign Application Priority Data

Mar. 6, 1991 [JP] Japan ................................ 3-04330

[51] Int. Cl.⁵ ........................ G03B 13/36; G03B 17/38
[52] U.S. Cl. .................................. 354/403; 354/266
[58] Field of Search ............................ 354/403, 266

[56] References Cited

U.S. PATENT DOCUMENTS

| | | | |
|---|---|---|---|
| 4,142,788 | 3/1979 | Matsumoto et al. | 354/53 |
| 4,288,151 | 9/1981 | Matsumoto et al. | 354/25 |
| 4,421,396 | 12/1983 | Matsuzaki | 354/403 |
| 4,464,037 | 8/1984 | Terui et al. | 354/266 X |
| 4,777,504 | 10/1988 | Akada et al. | 354/266 X |
| 4,803,507 | 2/1989 | Akashi et al. | 354/403 X |
| 5,001,508 | 3/1991 | Ogawa | 354/403 |
| 5,005,970 | 4/1991 | Kunishige | 356/1 |

FOREIGN PATENT DOCUMENTS

| | | |
|---|---|---|
| 57-34537 | 2/1982 | Japan . |
| 1-42639 | 2/1989 | Japan . |
| 3-36532 | 2/1991 | Japan . |
| 3-36533 | 2/1991 | Japan . |
| 2212688 | 7/1989 | United Kingdom . |

Primary Examiner—W. B. Perkey
Attorney, Agent, or Firm—Louis Weinstein

[57] ABSTRACT

The present invention comprises a distance measurement start signal output device for outputting a distance measurement start signal, a light projecting device for projecting a light flux to a distance measurement object multiple times in response to the distance measurement start signal, a light receiving device which is arranged a base length away from the light projecting device and receives the reflected light of the light flux from the distance measurement object, a distance information output circuit for outputting distance information according to the light receiving position of the reflected light in the light receiving device every time the light projecting device projects light, an arithmetic logic circuit for arithmetically and logically calculating a distance from the distance measurement object using an average of the distance information sent from the distance information output circuit, an exposure start signal output circuit for outputting an exposure start signal, and a control circuit for allowing the light projecting device to start light projection in response to an output of the distance measurement start signal, allowing the light projecting device to stop light projection in response to an output of the exposure start signal, and determining the distance from the distance measurement object according to the output of the arithmetic logic circuit.

30 Claims, 5 Drawing Sheets

“MEANS FOR REPEATEDLY MEASURING OBJECT DISTANCE RESPONSIVE TO PULSE LIGHT REFLECTED FROM AN OBJECT AND UTILIZING THE MEASUREMENTS FOR PHOTOGRAPHING”

BACKGROUND OF THE INVENTION

1. Field of the Invention

The present invention relates to a distance measuring apparatus. More particularly, this invention is concerned with a distance measuring apparatus designed for cameras to detect a distance from a subject for photography.

2. Description of the Related Art

As already known, the distance measuring apparatus for cameras to measure a distance from a subject by processing a signal originating from a subject image formed on an image sensor or other photoelectric transfer means is broadly divided into a passive type that uses brightness distribution information of a subject to calculate the distance from the subject and an active type that an infrared ray or ultrasonic beam is projected to a subject, and then the reflected signal is detected to measure the distance from the subject. Whichever type is adopted, a signal to be handled is so weak that distance measurement is always accompanied by a problem of deteriorated accuracy.

Figure 7:
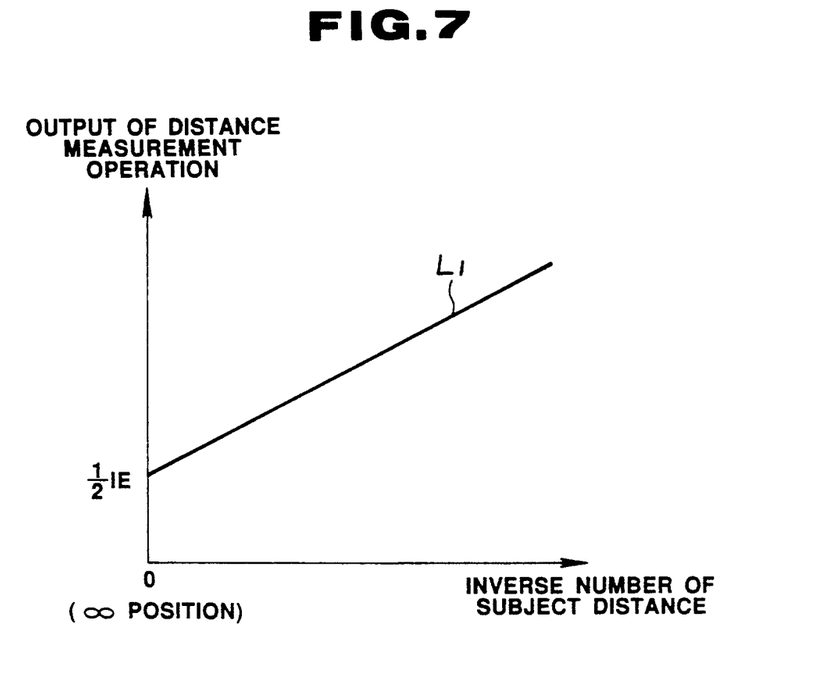
FIG. 7 shows a characteristic line plotting arithmetic logic outputs relative to reciprocals of subject distances in a conventional active type rectangular distance measuring apparatus.

An active type triangular distance measuring apparatus will be described as an example. An arithmetic logic output of distance measurement is provided as a single characteristic line L1, meaning that the arithmetic logic outputs are proportional to the reciprocals of distances from a subject as shown in FIG. 7. However, the signal reflected from a subject is provided as a very weak photocurrent, causing the quantity of light in the reflected light to lessen as small as several tens of picoamperes at a far distance. That is to say, the arithmetic logic outputs of the distance measurement are unreliable because of shot noise characteristic of a photocurrent detector or a photocurrent, or noise characteristic of a sensor for detecting the reflected signal.

Figure 8:
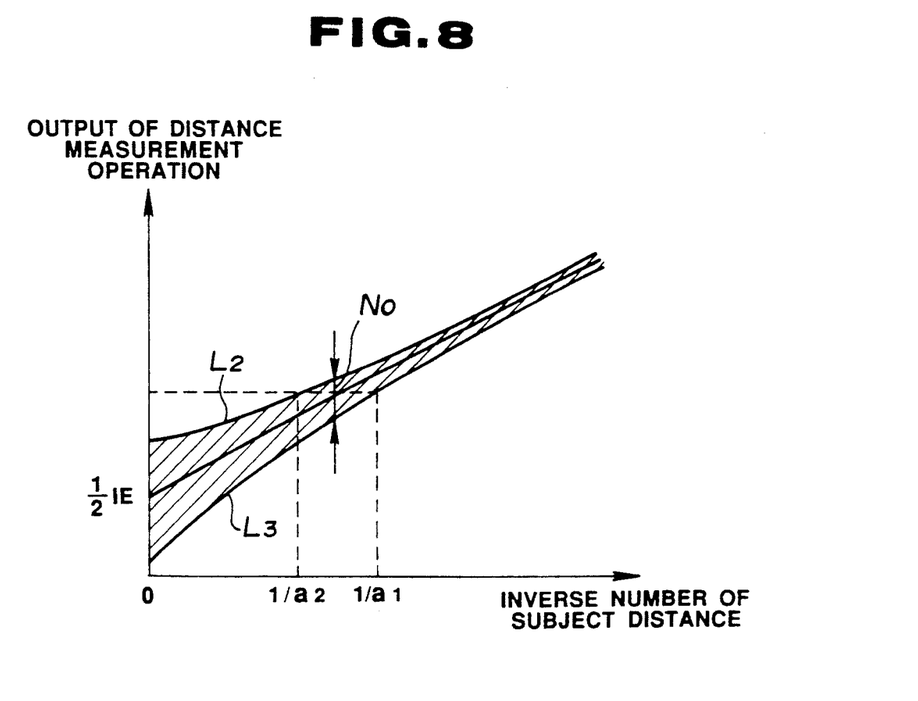
FIG. 8 shows a characteristic line shown in FIG. 7 with random noise superimposed.

For example, the line L1 shown in FIG. 7 resides in a band-like shaded zone of unreliability No which is sandwiched by curves L2 and L3 shown in FIG. 8. Therefore, the arithmetic logic outputs are represented as the values existent in a certain probability space. Specifically, the relationship between the outputs and the reciprocals of distances is not recognized as 1:1. As a result, the graph of arithmetic logic outputs vs. distance reciprocals does not become a single line.

The aforesaid unreliability may increase with the influence of illumination equipment including fluorescent lamps and neon signs, or other AC background light.

As an effective means for reducing the unreliability No and improving accuracy in distance measurement, for example, U.S. Pat. No. 5,005,970, U.K. Patent No. 2,212,688, and U.S. Pat. No. 5,001,508 have disclosed an integrating means for measuring a distance several times (n times), integrating distance measurement data, then averaging the data (this is a known means used for measuring instruments for detecting weak signals). According to this means, unreliability can be lessened to $1/n^{\frac{1}{2}}$ by performing distance measurement n times.

The integrating means is a very efficient signal processor, which is applicable to all active type distance measuring apparatuses. However, when the integrating means applies to a distance measuring apparatus for cameras, it poses a critical drawback. That is to say, it takes much time to measure conventional n-fold distances. This is a fatal drawback for cameras which must ensure timely shutter chances.

Sufficient time is required to measure a distance multiple times. This results in missing shutter chances even when priority has been given to shutter timings but not to correct focus control.

SUMMARY OF THE INVENTION

The principal object of the present invention is to provide a distance measuring apparatus for overcoming the foregoing problem and ensuring shutter chances despite a release time lag occurring when distance measurement is performed multiple times to improve accuracy in distance measurement.

A second object of the present invention is to provide a distance measuring apparatus allowing users to automatically select whether priority is automatically given to shutter chances or to sharp focus control, and thus perform photography consistently with the users' intentions.

To be brief, this invention comprises a distance measurement start signal output means for outputting a distance measurement start signal, a light projecting means for projecting a light flux to a distance measurement object multiple times in response to the distance measurement start signal, a light receiving means which is arranged a base length away from the light projecting means and receives the reflected light of the light flux from the distance measurement object, a distance information output means for outputting distance information according to the light receiving position of the reflected light in the light receiving means, an arithmetic logic means for arithmetically and logically calculating a distance from the distance measurement object using an average value of the distance information sent from the distance information output means, an exposure start signal output means for outputting an exposure start signal, and a control means for allowing the light projecting means to start light projection in response to an output of the distance measurement start signal, allowing the light projecting means to stop light projection in response to an output of the exposure start signal, then determining the distance from the distance measurement object according to the output of the arithmetic logic means.

Other objects and advantages of the present invention will be apparent from the detailed description set forth below.

DETAILED DESCRIPTION OF THE PREFERRED EMBODIMENTS

The present invention will be described more specifically in conjunction with the drawings.

Figure 1:
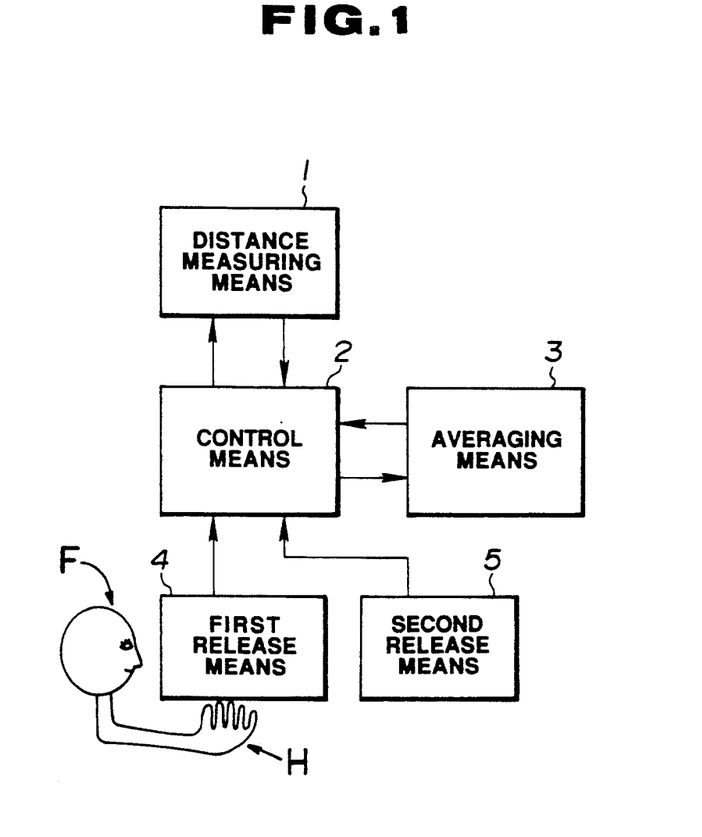
FIG. 1 is a block diagram of a distance measuring apparatus representing a first embodiment of the present invention.

FIG. 1 is a block diagram of a distance measuring apparatus representing the first embodiment of the present invention.

As shown in FIG. 1, when a first release means 4 applies a first release signal for starting distance measurement to a control means 2 for controlling the distance measurement of a distance measuring means 1, the control means 2 commands the distance measuring means 1 to start distance measurement. Acquired distance measurement data is transmitted to the control means 2. When a second release means 5 transmits a second release signal for starting actual exposure, the control means 2 stops the distance measurement of the distance measuring means 1, then sends the distance measurement data acquired during the distance measurement to an averaging means 3. Then, an average value calculated is transmitted to the control means 2.

Figure 2:
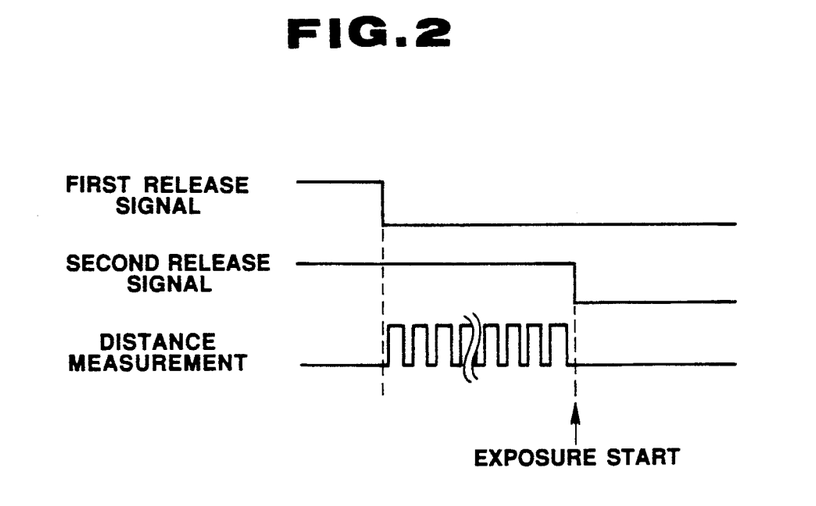
FIG. 2 is a timing chart for the distance measurement requiring a long pause before and after distance measurement in the first embodiment.
Figure 3:
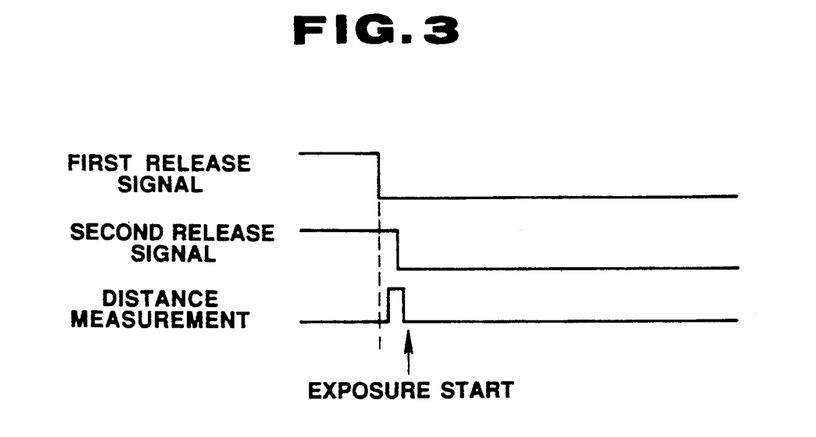
FIG. 3 is a timing chart for the distance measurement requiring a short pause before and after distance measurement in the first embodiment.

In this distance measuring apparatus, the distance measurement frequency is specified according to the pause from when the first release means for outputting the first release signal for starting distance measurement is turned on until the second release means for outputting the second release signal for starting actual exposure is turned on. That is to say, when the pause is prolonged, distance measurement is executed repeatedly as shown in FIG. 2. Acquired distance measurement data is averaged by the averaging means. On the other hand, when the pause is short, distance measurement is not repeated too many times, but is repeated, for example, once.

Figure 4:
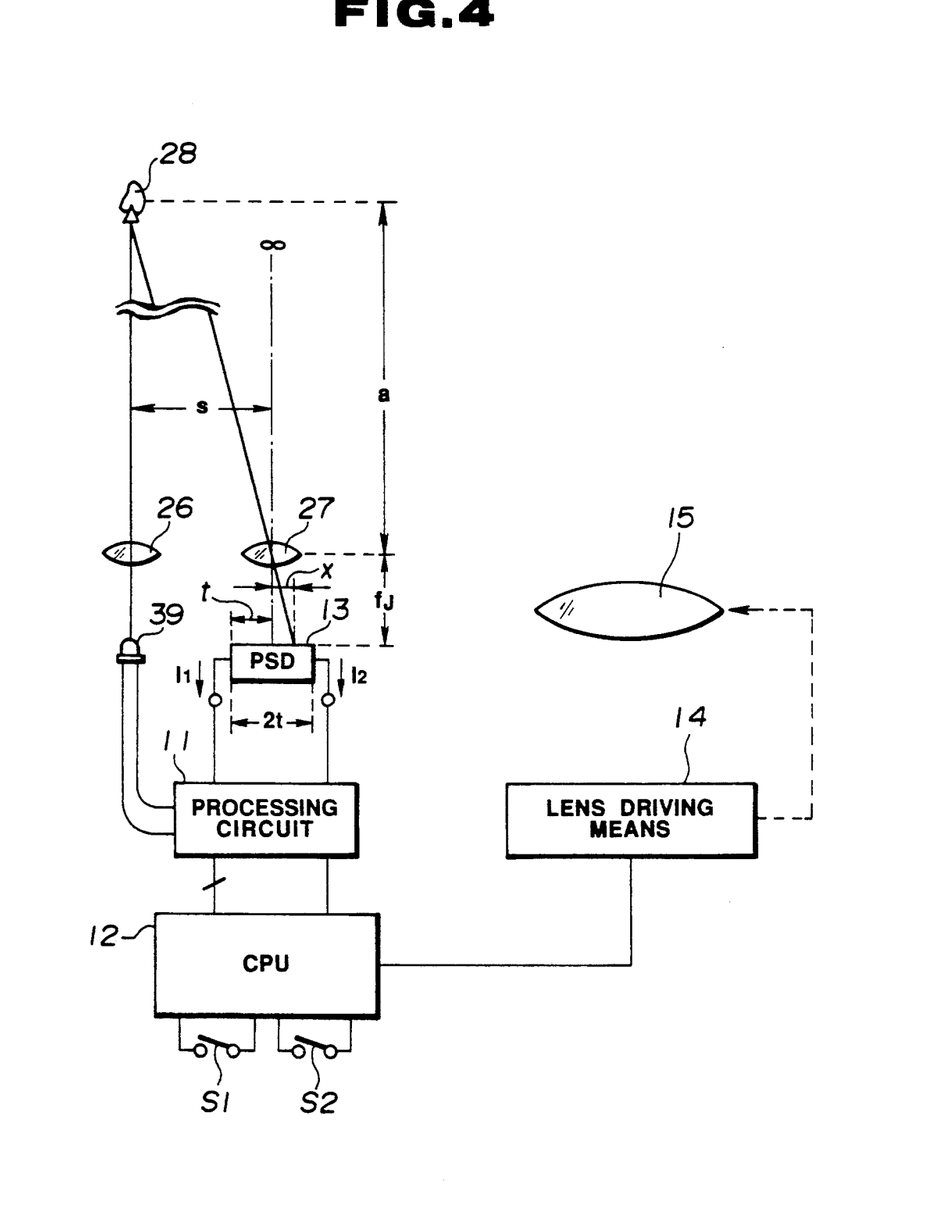
FIG. 4 is a block diagram for explaining FIG. 1 in detail.

FIG. 4 is a block diagram for explaining FIG. 1 in more detail, showing an example of distance measurement based on an active type rectangular distance measuring method. In response to a light emission signal sent from a processing circuit 11, a light projection device 39 emits pulsed light. The pulsed light is converged by a light projection lens 26, then emitted to a subject 28 at a subject distance a. Light reflected from the subject 28 passes through a light receiving lens 27 arranged a base length S away from the light projection lens 26, then forms an image on a semiconducting position sensitive device (hereafter, PSD) 13 arranged at a focal distance fJ. The center of the PSD 13 is aligned with the optical axis of the light receiving lens 27.

Photocurrents I1 and I2 from both ends of the PSD 13 enter the processing circuit 11 to undergo current-voltage conversion. Then, the voltages converted are deprived of stationary light components reflected from the background, then fed to a CPU 12.

The CPU 12 is connected to a first-stage release switch S1 that is turned on and off when a release button is pressed halfway, and a second-stage release switch S2 that is turned on and off when the release button is pressed fully. The first-stage release switch S1 and second-stage release switch S2 are employed as the first release means and second release means respectively as shown in a segment 1 of Table 1.

| Segment | 1st release means | 2nd release means |
|---|---|---|
| 1 | 1st-stage release switch | 2nd-stage release switch |
| 2 | Sensing means for sensing that a user's face has approached a camera | 1st-stage release switch |
| 3 | | 2nd-stage release switch |

Alternatively, as shown in segments 2 and 3, a sensing means for sensing that a user's face has approached a camera is used as the first release means, and the first-stage release switch S1 or second-stage release switch S2, as the second release means. Other various combinations are conceivable.

Figure 6:
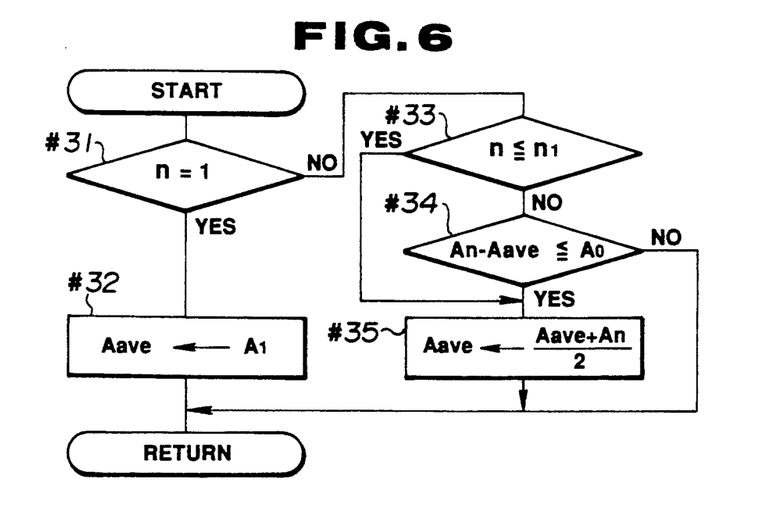
FIG. 6 is a flowchart showing distance measurement data processing shown in FIG. 5 in more detail.

Any of the sensing means described in the following documents may be utilized: Japanese Patent No. 34537/1982; Japanese Patent No. 42639/1989; Japanese Patent No. 36532/1991; Japanese Patent No. 36533/1991; U.S. Pat. No. 4,142,788 and U.S. Pat. No. 4,288,151. For example, according to the teachings of U.S. Pat. Nos. 4,142,788 and 4,288,151, light sensing means as shown in FIGS. 6 and 8; and heat sensing means as shown in FIG. 9 may be employed to indicate the nearness of an operator.

According to Japanese Published Pending Patent Application No. 3-36533/1991; Published Pending Application No. 57-34537/1982; Published Pending Patent Application No. 1-42639/1989; and Published Pending Patent Application No. 3-36532/1991 a redetecting means such as like detecting means infrared detecting or heat detecting means may be employed to detect the nearness of an operator's face to the camera. Note, for example, sensing means 20, 21 as shown in FIG. 7 of Application No. 3-36532; sensing means 41, 42 as shown in FIG. 5 of Application No. 1-42639; sensing means 10 as shown in FIGS. 1 and 2 of Application No. 57-34537; and sensing means 20, 21 as shown in FIG. 7 of Application No. 3-36533. Any of these sensing means may be employed as the first release means or the second release means. For example, FIG. 1 shows first release means in simplified block diagram form wherein when the face F of an operator is in close proximity to first release means 4, or alternatively, when the hand H is in close proximity to the first release means, the first release means operates the control means 2 to initiate distance measuring means 1 and averaging means 3. Alternatively, second release means may sense proximity of the face or hand in a similar fashion to initiate operation of the control means 2.

In any combination, with a signal sent from the first or second release means, the CPU 12 performs an arithmetic operation on the signal applied from the processing circuit 11 to calculate subject distance information or specify a distance measurement repetition frequency, or average distance measurement data acquired by multiple distance measurements.

After that, the CPU 12 drives a lens driving means 14 according to the result of the arithmetic operation, and thus controls drive of a photographic lens 15.

Next, the distance measurement in this embodiment having the aforesaid configuration will be described in conjunction with the flowcharts of FIGS. 5 and 6. When the first release means listed in Table 1 is turned on, variables Aave and n specifying a distance measurement data average and a distance measurement frequency are initialized or reset to 0s as shown below.

Aave=0
n=0

Figure 5:
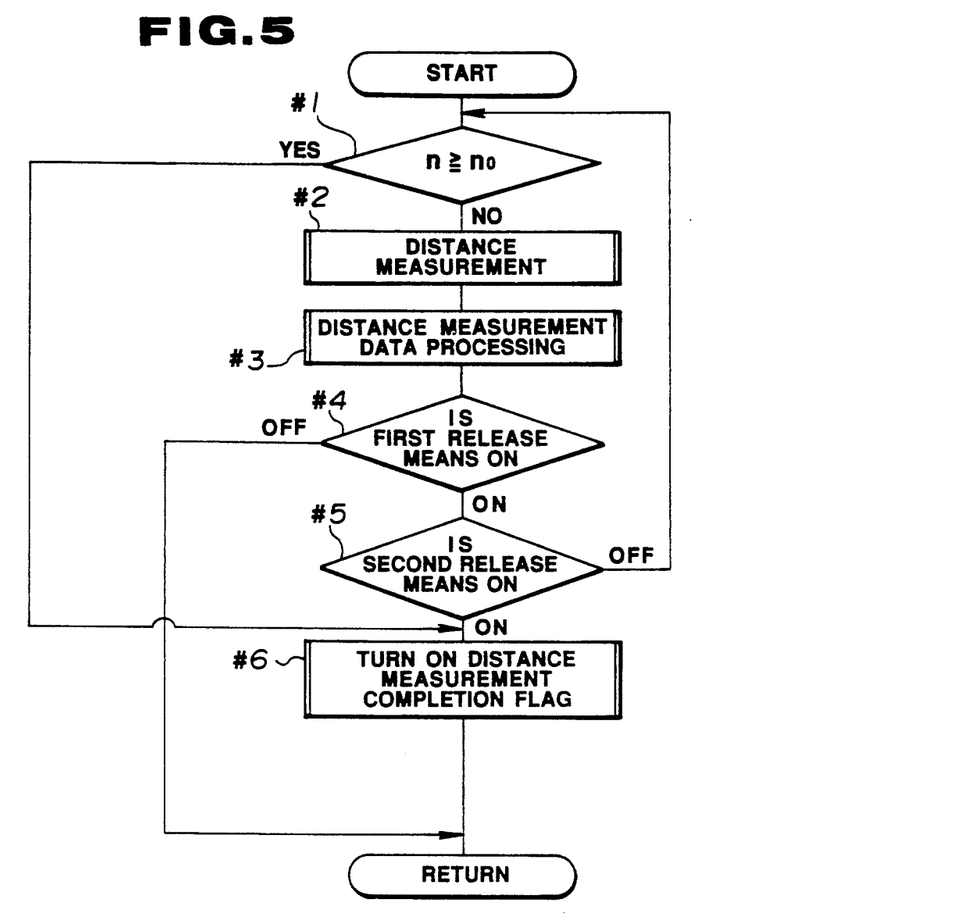
FIG. 5 is a flowchart showing distance measurement in the first embodiment.

A main routine calls a subroutine shown in FIG. 5. Thus, the processing flow starts.

At a step 1, it is determined whether the distance measurement frequency n has reached a given value or n0. The given value n0 is determined in consideration of the service lives of light emitting elements and the power consumption, so that necessary and sufficient accuracy in distance measurement can be ensured using an upper limiter for distance measurement frequencies. n0 may be a fixed value or calculated by analyzing an f-number, EV value, and other parameters. When it is found at this step 1 that the distance measurement frequency n exceeds the given value n0 1, a distance measurement completion flag is set at a step 6. Then, control passes to a step 4. If the distance measurement frequency n has not reached the given value n0, control advances to a step 2.

A routine for executing distance measurement is specified at the step 2. The specific embodiments are described in U.S. Pat. No. 5,005,970 this applicant has submitted. The description will, therefore, be omitted. When the routine is executed, digital distance measurement data is acquired. Then, when the distance measurement is complete, the distance measurement frequency n is incremented.

At a step 3, the deviations of acquired distance measurement data are integrated, then divided by the distance measurement frequency n to obtain an average. Then, the averaged distance measurement data is placed in the variable Aave for specifying a distance measurement data average.

At a step 4, it is determined if the first release means remains on. If the first release means is still on, control passes to a step 5. If off, the distance measurement completion flag is not set. Then, control escapes from the subroutine.

At a step 5, it is determined if the second release means is turned on. If the second control means is not turned on, control returns to the step 1. If on, control advances to a step 6. Then, the distance measurement completion flag is set. Then, control escapes from the subroutine.

Thus, after control escapes from the subroutine, the main routine detects the distance measurement completion flag. If the distance measurement completion flag is turned on, a subsequent camera sequence; such as, a photographic lens delivery sequence is executed according to the stored distance measurement data.

FIG. 6 is a flowchart for detailing the distance measurement data processing routine of the step 3 shown in FIG. 5. First, at a step 31, it is determined if the distance measurement frequency n indicates 1 or if the distance measurement data is the one acquired at the first distance measurement. If the distance measurement data is the one acquired at the first distance measurement, control advances to a step 32. Then, the first distance measurement data is placed in the distance measurement average Aave. Then, the routine terminates. On the other hand, if the distance measurement data is not the one acquired at the first distance measurement, control advances to a step 33.

At the step 33, it is determined if distance measurement data is the one acquired before the n1-th distance measurement. If distance measurement data is the one acquired before the n1-th distance measurement, averaging is performed at a step 35 unconditionally. Herein, the distance measurement frequency n1 may be one, three, five, or any other specific value, or a value varying depending on an EV value, f-number of the photographic lens, or any other parameter. However, the distance measurement frequency n1 must be smaller than n0 determined at the step 1 shown in FIG. 5.

When the distance measurement frequency n exceeds the given value n1, control advances to a step 34. Distance measurement data acquired after the n1-th distance measurement is averaged at the step 35 only when the difference between the distance measurement data An and the distance measurement average Aave of data acquired before the n1-th distance measurement is smaller than a given value A0.

The given value A0 may be a fixed value or any value associated with the distance measurement data average Aave. Alternatively, the value A0 may be a value varying depending on an EV value. Since it is determined if the difference between the distance measurement data An and the distance measurement average Aave of data acquired before the n1-th distance measurement exceeds the given value A0, outstandingly-deviated distance measurement data can be excluded from averaging. This helps improve accuracy in distance measurement.

Even when a user performs photography with a focus locked, the distance measurement data average Aave calculated previously will not be destroyed but stored despite greatly varying distance measurement data. Thus, this invention is very effective for the Focus Lock mode.

The aforesaid embodiments have been described in conjunction with an active type rectangular distance measurement equipment. Needless to say, the invention can apply to passive type distance measurement equipment.

According to the present invention, when a user shortens the pause between the operations of the first and second release means to reduce the release time lag in an attempt not to miss shutter chances, data acquired by executing distance measurement less frequently or once is adopted. On the other hand, when the pause is prolonged, distance measurement data deriving from the data acquired by executing distance measurement multiple times is adopted. Thus, users can automatically select a mode in which priority is automatically given to shutter chances or to sharp focus control. Consequently, users can take photographs consistent with their intentions.

According to the present invention, it will be apparent that a wide variety of working modes can be formed on a basis of the invention without departing from the spirit and scope of the invention. This invention will be limited to the appended claims but not restricted to any specific embodiment.

What is claimed is:

1. A distance detecting apparatus for cameras, comprising:
   a distance measurement start signal output means for outputting a distance measurement start signal;
   a light projecting means for projecting a light flux to an object multiple times in response to said distance measurement start signal;
   a light receiving means arranged a predetermined distance away from said light projecting means for receiving the reflected light of said light flux from said object;

a distance information output means for outputting distance information according to the position at which said reflected light is received by said light receiving means each time said light projecting means projects light;

an arithmetic logic means for arithmetically and logically calculating a distance from said distance measurement object using an average of distance information sent from said distance information output means;

an exposure start signal output means for outputting an exposure start signal; and a control means for allowing said light projecting means to start light projection in response to an output of said distance measurement start signal output means, enabling said light projecting means to stop light projection in response to an output of said exposure start signal, and determining the distance from said distance measurement object according to the output of said arithmetic logic means.

2. A distance detecting apparatus according to claim 1 further comprising a comparing means in which when the light projection frequency of said light projecting means is less than a given value, averaging is performed at every output of said distance information, and when the light projection frequency of said light projecting means exceeds the given value, an average of the distance information previously acquired is compared with current distance information.

3. A distance detecting apparatus according to claim 2 wherein said comparing means further comprises means for discarding current distance information when the difference between the average and the current distance information is greater than a predetermined value.

4. A distance detecting apparatus according to claim 1 wherein said distance measurement start signal output means comprises a switch to be turned on with the first-stage operation of a release button on a camera, and said exposure start signal output means comprises a switch to be turned on with the second-stage operation of the release button.

5. A distance detecting apparatus according to claim 1 wherein said distance measurement start signal output means detects the fact that an operator of a camera has hold of the camera to provide an output, and said exposure start signal output means comprises a switch to be turned on responsive to one of the first-stage and second-stage operation of the release button on the camera.

6. A distance detecting apparatus for cameras, comprising:

a distance measurement start signal output means for outputting a distance measurement start signal;

a light projecting means for projecting a light flux to an object multiple times in response to said distance measurement start signal;

a light receiving means which is arranged a predetermined distance away from said light projecting means for receiving the reflected light of said light flux from said object;

a distance information output means for outputting distance information according to the position at which said reflected light is received by said light receiving means each time said light projecting means projects light;

an arithmetic logic means for arithmetically and logically calculating a distance of said object using an average of distance information sent from said distance information output means;

a distance measurement termination signal output means for outputting a distance measurement termination signal; and a control means for allowing said light projecting means to start light projection in response to an output of said distance measurement start signal, said control means including means for allowing said light projecting means to stop light projection when the light projection frequency of said light projecting means has reached said first given value or an output of said distance measurement termination signal has been provided, and means for determining the distance from said distance measurement object according to the output of said arithmetic logic means.

7. A distance detecting apparatus according to claim 6 wherein said arithmetic logic means includes a comparing means in which when the light projection frequency of said light projecting means is less than a second given value smaller than said first given value, averaging is performed at every output of said distance information, and when the light projection frequency of said light projecting means exceeds said second given value, an average of previously acquired distance information is compared with current distance information.

8. A distance detecting apparatus according to claim 7 wherein said comparing means further comprises means for discarding current distance information when the difference between the average and the current distance information is greater than a predetermined value.

9. A distance detecting apparatus according to claim 6 wherein said distance measurement signal output means comprises a switch to be turned on with the first-stage operation of a release button on a camera, and said distance termination signal output means comprises a switch to be turned on with the second-stage operation of the release button.

10. A distance detecting apparatus according to claim 6 wherein said distance measurement start signal output means detects the fact that an operator of a camera has hold of the camera to provide an output, and said distance measurement termination signal output means comprises a switch to be turned on responsive to one of a first-stage and a second-stage operation of a release button on the camera.

11. A distance detecting apparatus, comprising:

a distance measuring means for projecting a light flux to an object, receiving the reflected light of said light flux from said distance measurement object, and outputting distance measurement information;

a distance measurement start signal output means for outputting a signal for allowing said distance measuring means to start distance measurement;

a distance measurement termination signal output means for outputting a signal for allowing said distance measuring means to terminate distance measurement in association with a manual operation;

a control means for allowing said distance measuring means to repeat a distance measurement until the outputs of said distance measurement start signal output means and said distance measurement termination signal output means, said distance measurement start signal, and said distance measurement termination signal, are sequentially provided in the last-mentioned order; and an arithmetic logic means for arithmetically and logically calculating the distance of the object using an average of distance information obtained from said distance measuring means.

12. A distance detecting apparatus according to claim 11 wherein said arithmetic logic means includes a comparing means in which when the frequency of said distance measurement is less than a given value, averaging is performed at output of said distance information, and when the frequency of said distance measurement exceeds said given value, an average of previously-acquired distance information is compared with current distance information.

13. A distance detecting apparatus according to claim 12 wherein said comparing means further comprises means for discarding current distance information when the difference between the average and the current distance information is greater than a predetermined value.

14. A camera having a distance detecting apparatus, comprising:
   a light projecting means for projecting a pulsed light flux to a subject;
   a distance measuring means for receiving the reflected light of said light flux from said subject, and measuring the distance of said subject;
   an operation means providing a command for starting the distance measurement of said distance measuring means;
   a release means providing a command for starting an exposure;
   a first control means for allowing said distance measuring means to execute distance measurement repeatedly according to a command issued from said operation means, and terminating said distance measurement according to a command issued from said release means;
   an averaging means for averaging the results of distance measurement repeated by said distance measuring means; and
   a second control means for controlling focus according to an average of the results of distance measurement calculated by said averaging means in response to a command issued from said release means.

15. A camera having a distance detecting apparatus according to claim 14 wherein said first control means further includes a counting means for incrementing the frequency of distance measurements performed by said distance measuring means, and means for stopping the distance measurement when said frequency exceeds a first given value.

16. A camera having a distance detecting apparatus according to claim 14 wherein said averaging means includes a counting means for incrementing the frequency n of distance measurement performed by said distance measuring means, and prevents an averaging operation when said frequency n exceeds a second given value and the difference between an average of results of distance measurement and the result of the n-th distance measurement exceeds a given value.

17. A camera having a distance detecting apparatus according to claim 14 wherein said operation means comprises a switch to be turned on with the first-stage operation of a release button, and said release means comprises a switch to be turned on with the second-stage operation of the release button.

18. A camera having a distance detecting apparatus according to claim 14 wherein said operation means comprises sensing means for sensing the fact that a user's face has approached a camera, and said release means comprises a switch to be turned on with the first-stage or second-stage operation of said release button.

19. A camera having a distance detecting apparatus, comprising:
   a distance measuring means capable of repetitive distance measurement for projecting pulsed light to a subject, detecting a distance from said subject using the reflected light of the light projected coming from said subject, and outputting the results of distance measurement provided by repeatedly projecting said pulsed light;
   a first means for commanding the start of distance measurement;
   a second means for manually commanding the start of an exposure;
   a control means for allowing said distance measuring means to execute distance measurement repeatedly according to the operation of said first means, allowing said distance measuring means to stop distance measurement according to the operation of said second means, and means for moving a focusing lens responsive to said second means and according to said distance measurements, allowing said distance measuring means to start an exposure.

20. A camera having a distance detecting apparatus, comprising:
   a distance measuring means capable of repetitive distance measurement for projecting pulsed light to a subject, detecting a distance from said subject using the reflected light of the light projected coming from said subject, and outputting the results of distance measurement provided by repeatedly projecting said pulsed light;
   a first means for commanding the start of distance measurement;
   a second means for manually commanding the start of an exposure;
   a control means for allowing said distance measuring means to execute distance measurement repeatedly according to the operation of said first means, allowing said distance measuring means to stop distance measurement according to the operation of said second means and allowing said distance measuring means to start an exposure;
   said distance measuring means including an arithmetic logic means for arithmetically and logically averaging the results of distance measurement performed repeatedly, and said control means controls a photographic lens according to the result of said arithmetic and logic averaging.

21. A camera having a distance detecting apparatus, comprising:
   a distance measuring means capable of repetitive distance measurement for projecting pulsed light to a subject, detecting a distance from said subject using the reflected light of the light projected coming from said subject, and outputting the results of distance measurement provided by repeatedly projecting said pulsed light;

a first means for commanding the start of distance measurement;

a second means for manually commanding the start of an exp a control means for allowing said distance measuring means to execute distance measurement repeatedly according to the operation of said first means, allowing said distance measuring means to stop distance measurement according to the operation of said second means and allowing said distance measuring means to start an exposure;

said control means including a distance measurement stoppage means for stopping distance measurement when distance measurement has been repeated by a given frequency.

22. A camera according to claim 19 wherein said control means further comprises means for utilizing the last distance calculation responsive to operation of said second means.

23. A camera control method for a camera including a distance measuring means for projecting pulsed light to a subject, detecting a distance from said subject using the reflected light of said projected light coming from said subject, and outputting the results of distance measurement provided by repeatedly projecting said pulsed light, a first manual member for manually commanding the start of distance measurement, and a second manual member for manually commanding the start of exposure, comprising the steps of:

(a) operating said distance measuring means to execute distance measurement repeatedly responsive to the operation of said first manual member; and (b) stopping said distance measuring means to stop distance measurement responsive to the operation of said second manual member;

(c) focusing a taking lens employing a measurement obtained in step (a) responsive to operation of said second manual member; and allowing said distance measuring means to start exposure.

24. The method of claim 23 further comprising the step of: utilizing the last distance measurement obtained when operating said distance measuring means to execute distance measurement repeatedly responsive to operation of the second manual member.

25. A method for operating a camera comprising the steps of:

operating a manually movable member to initiate a measurement sequence;

directing a plurality of light pulses toward an object whose distance is to be measured responsive to operation of said movable member;

determining the distance of said object responsive to projected light reflected from said object due to each light pulse;

terminating measurement responsive to operation of a second manually movable member which is operated to command the start of an exposure; and utilizing at least one of the measured object distances for an exposure for focusing a lens responsive to operation of the second manually movable member.

26. A method for operating a camera comprising the steps of:

operating a manually movable member to initiate a measurement sequence;

directing a plurality of light pulses toward an object whose distance is to be measured responsive to operation of said movable member;

determining the distance of said object responsive to projected light reflected from said object due to each light pulse;

terminating measurement responsive to operation of a second manually movable member which is operated to command the start of an exposure;

utilizing at least one of the measured object distances for an exposure; and averaging each object distance with the previous object distance so long as said second movable member has not been operated.

27. The method of claim 26 wherein the step of obtaining an average object distance is terminated when the number of object measurements reach a given value.

28. The method of claim 26 further comprising the step of:

comparing the last measurement distance with the previous average distance value and discarding the last measured distance value when the difference is greater than a predetermined value.

29. A method for operating a camera comprising the steps of:

operating a manually movable member to initiate a measurement sequence;

directing a plurality of light pulses toward an object whose distance is to be measured responsive to operation of said movable member;

determining the distance of said object responsive to projected light reflected from said object due to each light pulse;

terminating measurement responsive to operation of a second manually movable member which is operated to command the start of an exposure;

utilizing at least one of the measured object distances for an exposure; and wherein the step of using at least one object distance measurement further comprises the step of averaging the distance measurements after each measurement is completed and using the average obtaining when the second movable member is operated.

30. A camera having a distance detecting apparatus comprising:

distance measuring means, capable of repetitive distance measurement including means for repetitively projecting pulsed light toward an object;

means for detecting the distance from said object using reflected light of the pulsed light projected toward said object by said repetitive light pulsing means;

means for outputting the results of the distance measurement from said distance detecting means;

first means for commanding the start of a distance measurement;

second means for manually initiating an exposure operation;

first determining means for enabling said distance measuring means to repeatedly execute distance measurements responsive to the operation of said first means, said first determining means including means for determining a first measure distance value from an average of the predetermined measured distance values provided by said distance measuring means;

second determining means for determining a second measured distance value responsive to operation of said second means; and photographic lens driving means for driving a movable photographic lens to a predetermined position based on said first and second measured distance values.

* * * * *

UNITED STATES PATENT AND TRADEMARK OFFICE
CERTIFICATE OF CORRECTION

PATENT NO.    : 5,268,729
DATED         : December 7, 1993
INVENTOR(S)   : Kunishige It is certified that error appears in the above-indentified patent and that said Letters Patent is hereby corrected as shown below:

On the title page: Item [30]

Title Page, Foreign Application Priority Date, change the Japanese Application Number to -- 3-40330 --

Column 11, line 4, change "exp" to --exposure;--

Signed and Sealed this

Sixteenth Day of August, 1994

*Attest:*

BRUCE LEHMAN

*Attesting Officer*    *Commissioner of Patents and Trademarks*